United States Patent [19]

Bebermeier

[11] Patent Number: 4,728,085
[45] Date of Patent: Mar. 1, 1988

[54] DIAPHRAGM-LIKE ELEMENT

[75] Inventor: Jürgen Bebermeier, Hanover, Fed. Rep. of Germany

[73] Assignee: Continental Gummi-Werke Aktiengesellschaft, Hanover, Fed. Rep. of Germany

[21] Appl. No.: 893,709

[22] Filed: Aug. 6, 1986

[30] Foreign Application Priority Data

Aug. 6, 1985 [DE] Fed. Rep. of Germany ....... 3528158

[51] Int. Cl.⁴ ............................................. F16F 5/00
[52] U.S. Cl. ..................................... 267/122; 92/104; 267/64.27; 267/141
[58] Field of Search .............................. 267/122-123, 267/140.1, 141, 141.1-141.7, 153, 152, 64.23, 64.24, 64.27, 63, 35; 188/298, 320, 366-367; 428/64; 248/632, 634, 638, 635, 561, 562; 92/104, 96-103; 138/30; 181/171-174; 277/209-211; 251/331-335

[56] References Cited

U.S. PATENT DOCUMENTS

| | | | |
|---|---|---|---|
| 1,523,670 | 1/1925 | Sutlive | 181/174 X |
| 1,544,180 | 6/1925 | Reiter | 277/210 |
| 2,632,475 | 3/1953 | Elo | 92/104 X |
| 3,011,758 | 12/1961 | McFarland, Jr. | 92/104 X |
| 3,151,869 | 10/1964 | Butcher | 277/211 X |
| 3,191,950 | 6/1965 | Hiltner | 277/211 X |
| 3,204,568 | 9/1965 | Grossfield | 92/104 X |
| 3,836,183 | 9/1974 | Battle | 277/211 X |
| 4,270,441 | 6/1981 | Tuck, Jr. | 92/103 SD X |
| 4,352,487 | 10/1982 | Shtarkman | 248/634 X |

FOREIGN PATENT DOCUMENTS 2344530 3/1974 Fed. Rep. of Germany ......... 92/96

Primary Examiner—Douglas C. Butler
Attorney, Agent, or Firm—Becker & Becker

[57] ABSTRACT

A flexible diaphragm-like element that serves as a partition between the two chambers of a damping mechanism of a resilient motor mount. These chambers are filled with damping fluid, and their volume can be varied as a function of the springing movements of the resilient mounting elements, with the damping action deriving from the throttled transfer of the fluid from one chamber into the other. To prevent noise from being produced, the diaphragm-like element is secured in such a way that it has freedom of movement. This freedom of movement is set in the diaphragm-like element itself by dividing the latter into three concentrically disposed and interconnected ringshaped zones, namely a radially inner zone, a central zone, and a radially outer zone, with the thickness of the central zone being considerably less than the thickness of the inner and outer zones. The limitation of the freedom of movement is brought about by forming on both sides of the central zone projections in the form of a post configuration including cylindrical projections as well as cylindrical projections having axially continuous side ribs or beads and prism-like and/or post-like shapes with multiple corners.

10 Claims, 7 Drawing Figures

DIAPHRAGM-LIKE ELEMENT

BACKGROUND OF THE INVENTION

1. Field of the Invention

The present invention relates to a flexible diaphragm-like element, especially a balancing-out element for a hydraulically damped resilient mounting, with the element being made of rubber or rubber-like synthetic material, with or without reinforcing elements.

2. Description of the Prior Art

Pursuant to heretofore known proposals, the motor mounts in motor vehicles, and also in other resilient mounting systems, contain, in the associated damping mechanism, two chambers that are filled with a damping fluid and are separated from one another by a flexible diaphragm-like element, to so-called balancing-out element, which is frequently secured in such a way that it is also movable with axial play. With regard to the significance of their function for the oscillation characteristic and the desired acoustical insulation of the mounting, it has become necessary to have relatively expensive constructions not only of the balancing-out diaphragm-like element itself, but also of the associated elements, such as the freedom of movement mechanisms and the transfer flow throttle. The requirements for great precision of all of several molded parts within narrow tolerances force the preferred use of precision die casting and other expensive manufacturing processes, thus disproportionately raising the overall costs for the manufacture of a mounting right from the beginning.

In contrast, it is an object of the present invention, via a novel configuration of the balancing-out diaphragm-like element, to enable structural simplification of the damping mechanism of resilient mountings, thus also reducing the overall manufacturing costs.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
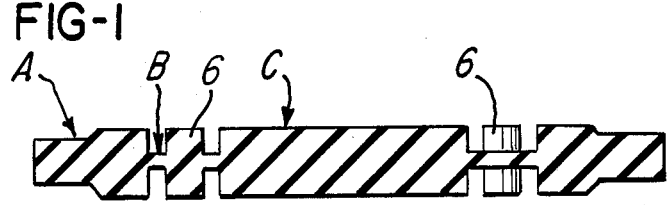
FIG. 1 is a cross-sectional view, along line I—I in FIG. 2, through one inventive embodiments of a balancing-out diaphragm-like element in the state of rest.

The flexible diaphragm-like element of the present invention comprises: three concentrically disposed and interconnected ring-shaped zones, namely a radially inner zone, a central zone, and a radially outer zone, with the thickness of the central zone being considerably less than the thickness of the inner and outer zones; and elements that are formed on the central zone and are distributed over the periphery thereof with reciprocal spacing. These latter elements can have a prism or post-like shape, and are preferably cylindrical bodies.

The ring-shaped central zone is advantageously disposed in the horizontal central plane of the diaphragm-like element, with the elements being formed thereon on both sides. In this case, elements formed on opposite sides of the ring-shaped central zone are respectively aligned with one another. Pursuant to a further specific feature of the present invention, the elements on the central zone are disposed along an arc and are spaced from one another by a distance that is several times greater than a distance of a given one of these elements from the inner and outer zones. The height of the elemtns on the central zone essentially corresponds to the thickness of the inner and outer zones.

The present invention provides a diaphragm-like element having a central portion that, via deep annular grooves on both sides, is functionally separate from the outer zone and is movable relative to the latter due to the extreme thinness of the central zone at the base of the grooves. However, the freedom of movement of this central zone is limited by the elements that are formed on the connecting wall thereof in the shape of post or other projections. This limitation comes about because every time the central zone is deflected, the elements formed thereon become increasingly inclined relative to the axial direction until they alternately abut the upper and lower sides of the diaphragm-like element against on one side the outer and on the other side the inner delimitations of the annular grooves; this interrupts the further movement of the central zone. It is thus possible, by appropriately dimensioning the elements formed on the central zone, and primarily the height thereof and their distance from the edges of the grooves, to provide a precisely determined freedom of movement.

The novel balancing-out diaphragm-like elements of the present invention are thus provided with a built-in freedom of play. Therefore, to use these diaphragm-like elements for acoustical damping in damping mechanisms of resilient mountings, no special expensitures are required. Rather, in a cost-saving manner, the inventive diaphragm-like elements can be secured in a simple conventional manner. Since all of the otherwise critical and close-tolerance dimensions are combined in a single, easy-to-manufacture formed rubber part, there is no longer any necessity for using expensive precision processes. Consequently, mounting systems equipped with the inventive diaphragm-like elements are at least as functionally reliable as the heretofore known mountings, yet are considerably more economical to produce.

Further specific features of the present invention will be described in detail subsequently.

DESCRIPTION OF PREFERRED EMBODIMENTS

Figure 2:
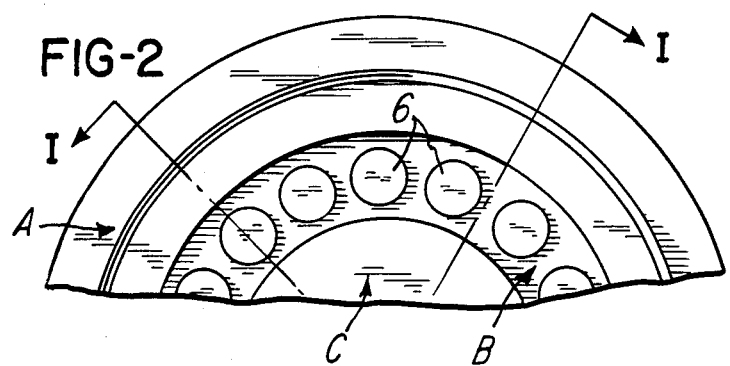
FIG. 2 is a fragmentary plan view of the diaphragm-like element of FIG. 1.
Figure 3:
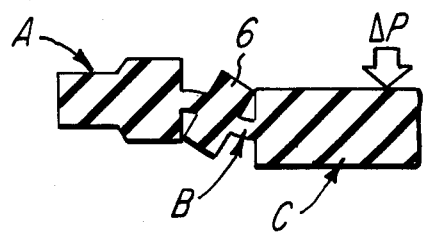
FIG. 3 is a fragmentary cross-sectional view of the diaphragm-like element of FIG. 1 in the deflected and blocked state.

Referring now to the drawing in detail, the diaphragm-like element illustrated in FIGS. 1 to 3 is a balancing-out element in the damping mechanism of, for example, a motor mount of any desired construction. The diaphragm-like element is made of a synthetic rubber and has no reinforcing elements. The diaphragm-like element is functionally divided into three concentrically disposed interconnected circular or ring-shaped zones. The radially outer zone A is used to secure the diaphragm-like element in a non-illustrated mounting housing. The radially inner zone C is axially movable relative to the outer zone A. A central bending zone B interconnects the two zones A and C. Whereas the outer zone A and the inner zone C are relatively thick and are for all practical purposes not deformable, the bending zone B, which in contrast is very thin in the nature of a film, forms the actual deforming part of the diaphragm-like element. This bending zone B enables all deflections of the inner zone C in both directions as a consequence of pressure differentials in the chambers of the damping mechanism, with these chambers being separated from one another by the diaphragm-like element.

Pursuant to the present invention, cylindrical projections 6 are formed on the bending surface of the central ring-shaped zone B, with these projections 6 being distributed over the periphery of the surface of the zone B and being reciprocally spaced along an arc. The projections 6 are continuous on both sides of the bending surface, and have an axial length that corresponds approximately to the thickness of the adjacent zones A and C; the diameter of the projections 6 is only slightly less than the radial width of the zone B, whereas the spacing of the projections is approximately of the order of magnitude of their diameters. The impact of the projections 6 upon the movements of the diaphragm-like element can be seen from FIG. 3. Under the effect of a pressure differential ΔP on one side, the inner zone C first freely deflects until the projections 6, which are now tilted, wedge between the facing walls of the zones A and C and thereby block further movement of the diaphragm-like element. After this phase has been reached, the pressure differences can now, in a known manner, be equalized only by throttled displacement of the damping fluid between the chambers of the damping mechanism via the transfer bore provided for this purpose. The freedom of movement that is available in each case can be tentatively determined by an appropriate dimensioning of the projections 6, and in particular an appropriate dimensioning of the axial length and diameter of these projections.

Figure 4:
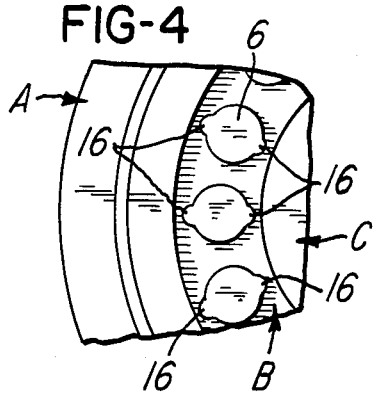
FIGS. 4 and 5 are fragmentary plan views of two further variations of the present invention.
Figure 5:
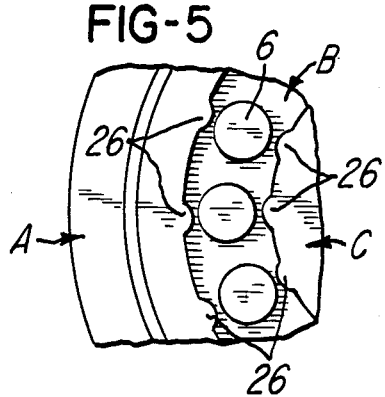

A soft, progressive suppression of the movement of the diaphragm-like element can be achieved by providing the projections 6 with axially continuous side ribs or beads 16, as shown in FIG. 4. The same effect can be achieved with the variation shown in FIG. 5, where such ribs or beads 26 are provided on those edge surfaces of the adjacent zones A and C that face the projections 6.

Figure 2A:
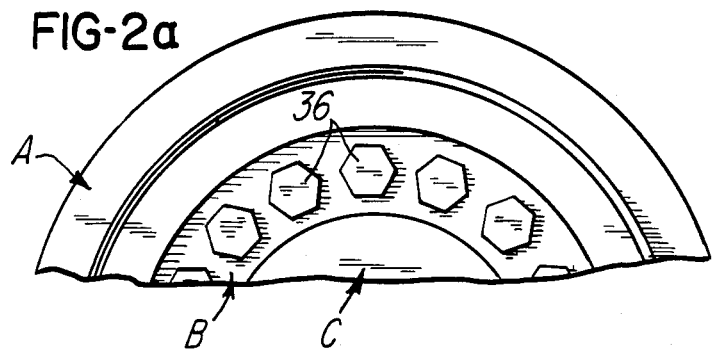
FIG. 2a is a fragmentary plan view of the diaphragm-like element having prism-shaped projections each with hexagonal outline.

FIG. 2a shows a fragmentary plan view of the diaphragm-like element having prism-shaped projections each with hexagonal outline 36.

Figure 2B:
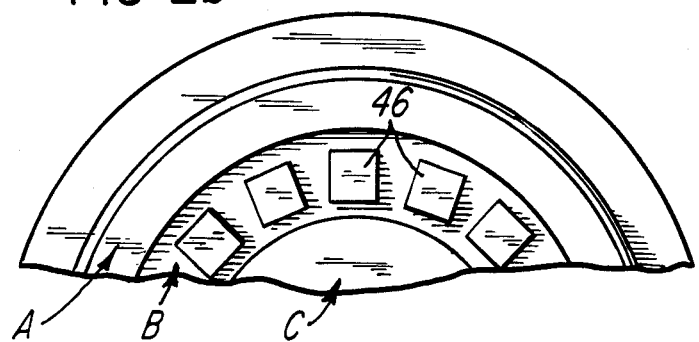
FIG. 2b is a fragmentary plan view of the diaphragm-like element having prism-shaped projections each with quadratic outline.

FIG. 2b is a fragmentary plan view of the diaphragm-like element having post-like-shaped or prism-shaped projections each with a quadratic or squared outline 46.

The present invention is, of course, in no way restricted to the specific disclosure of the specification and drawings, but also encompasses any modifications within the scope of the appended claims.

What I claim is:

1. A flexible balancing-out diaphragm-like element made of rubber or rubber-like synthetic material structurally simplified as a molded part within close tolerances thus also reducing overall manufacturing costs, with or without reinforcing elements, comprising:

three concentrically disposed and completely interconnected ring-shaped zones all of the same material including namely a radially inner zone, a central zone, and a radially outer zone, the a thickness of said central zone for deformation bending with built-in freedom of movement and axial play in an annular groove being considerably less axially than a greater thickness axially of said inner and outer zones respectively; and projecting elements that are formed integrally on said lesser thickness central zone that extend substantially in axial direction thereof as well as being located in the annular groove having a radial width only slightly greater than width of said projecting elements and that are distributed over the periphery thereof with reciprocal spacing to provide a precisely built-in freedom of movement of axial play of said central zone subject to limitation by said projecting elements so that such limitation comes about because every time said central zone of less thickness is deflected these projecting elements formed on said central zone become increasingly inclined relative to the axial direction until the projecting elements alternately abut against respective sides of said radially inner zone and said radially outer zone each of greater thickness so as to interrupt further movement of said central zone.

2. A diaphragm-like element according to claim 1, which has a central plane, with said central zone being disposed in said central plane, and with said projecting elements being disposed on both sides of said central zone.

3. A diaphragm-like element according to claim 2, in which respective ones of said projecting elements on opposite sides of said central zone are aligned with one another.

4. A diaphragm-like element according to claim 3, in which said projecting elements are disposed along an arc, with the distance between adjacent ones of said projecting elements being several times greater than the distance between said projecting elements and either said inner zone or said outer zone.

5. A diaphragm-like element according to claim 4, in which each of said projecting elements has a prism-like shape.

6. A diaphragm-like element according to claim 4, in which each of said projecting elements has a post-like shape.

7. A diaphragm-like element according to claim 4, in which each of said projecting elements has a cylindrical shape.

8. A diaphragm-like element according to claim 4, in which said projecting elements project axially from said central zone and have an axial length that essentially corresponds to the thickness of said inner and outer zones.

9. A diaphragm-like element according to claim 8, in which surfaces of said projecting elements that face said inner and outer zones are provided with continuous axial ribs or beads that extend over the entire height of said projecting elements.

10. A diaphragm-like element according to claim 8, in which surfaces of said inner and outer zones that face said projecting elements are provided with continuous rib-like or bead-like bulged portions that extend in the axial direction over the entire height of said inner and outer zones.

* * * * *